Feb. 16, 1971 H. LA MERS ET AL 3,562,890

FASTENER APPARATUS

Filed Sept. 23, 1968

INVENTORS
HERBERT N. SANDEL
HERBERT LA MERS
BY
Lindenberg & Freilich
ATTORNEYS

United States Patent Office 3,562,890

Patented Feb. 16, 1971

3,562,890

FASTENER APPARATUS

Herbert la Mers and Herbert N. Sandel, Los Angeles, Calif., assignors to Rapid Merchandising Company, Incorporated, Minneapolis, Minn., a corporation of Minnesota

Filed Sept. 23, 1968, Ser. No. 761,435

Int. Cl. B23p *19/04;* B23q *17/00*

U.S. Cl. 29—208 8 Claims

ABSTRACT OF THE DISCLOSURE

Apparatus for fastening an inventory control card to a record album. The apparatus comprises an album nest for receiving a record album, a movable card nest, and an album sensor. When the sensor detects an album in the album nest, it operates a piston that moves the card nest against the album to clamp it in place. Another sensor detects the presence of a card within the card nest to operate machinery that fastens the card onto the album.

BACKGROUND OF THE INVENTION

(1) Field of the invention

This invention relates to fastening machinery.

(2) Description of the prior art

Phonograph records are often packaged as albums containing a single record in a cardboard jacket. The jacket is protected against dirt and unauthorized opening by a transparent plastic cover. Inventory control of record albums is maintained by applying inventory control labels in a form such as that of the well known "IBM" cards to the cover of the album. The IBM cards contain holes punched in accordance with a code to identify the stock number of the particular album title. The salesclerk removes the card at each sale, and at weekly or other periodic intervals the cards are gathered and processed through a card reader for automatic reordering of new albums. The use of such inventory control labels is described in co-pending patent application by Herbert Sandel entitled Inventory Control Apparatus, Ser. No. 761,440, filed Sept. 23, 1968.

As described more fully in the above co-pending application, the cards are held to the album cover by two strips of tape. One strip extends along the bottom edge of the card and the other extends across an upper corner. The cards are typically applied by a local record jobber. Fastening apparatus of relatively low cost would be valuable in the implementation of low cost record inventory control as well as in a variety of other applications.

OBJECTS AND SUMMARY OF THE INVENTION

One object of the present invention is to provide economical fastening apparatus for the mass production fastening of articles at predetermined locations.

Another object is to provide apparatus for facilitating the fastening of inventory control cards to record albums.

In accordance with the present invention, apparatus is provided for the mass production fastening of a second article at a particular location on a first article. The apparatus comprises a first nest and a sensor for detecting the reception of the first article therein. A second nest clamps the first article in place and provides a target for receiving the second article. When another sensor detects the second article in the second nest, it operates a fastening machine that fastens the articles together and then releases them from the nests.

In accordance with one embodiment of the invention, a machine is provided for fastening an inventory control card on a record album. The machine includes a platform upon which the album is laid, and a right angle nest for receiving a corner of the album to fix its position on the platform. As the album is moved into the album nest, it closes a pair of switches, and a card nest is moved down on the album to clamp it on the platform. The card nest is a small right angle fixture for receiving the corner of an inventory control card at a precise location on the album. As the card is moved into the card nest, it closes another pair of switches that operate tape applying apparatus. The tape applying apparatus moves down to press a pair of tape strips against the edge of the card to fasten it on the album. Then the tape applying apparatus and card nest move up to release the album so it can be removed and another album and card inserted into the machine.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
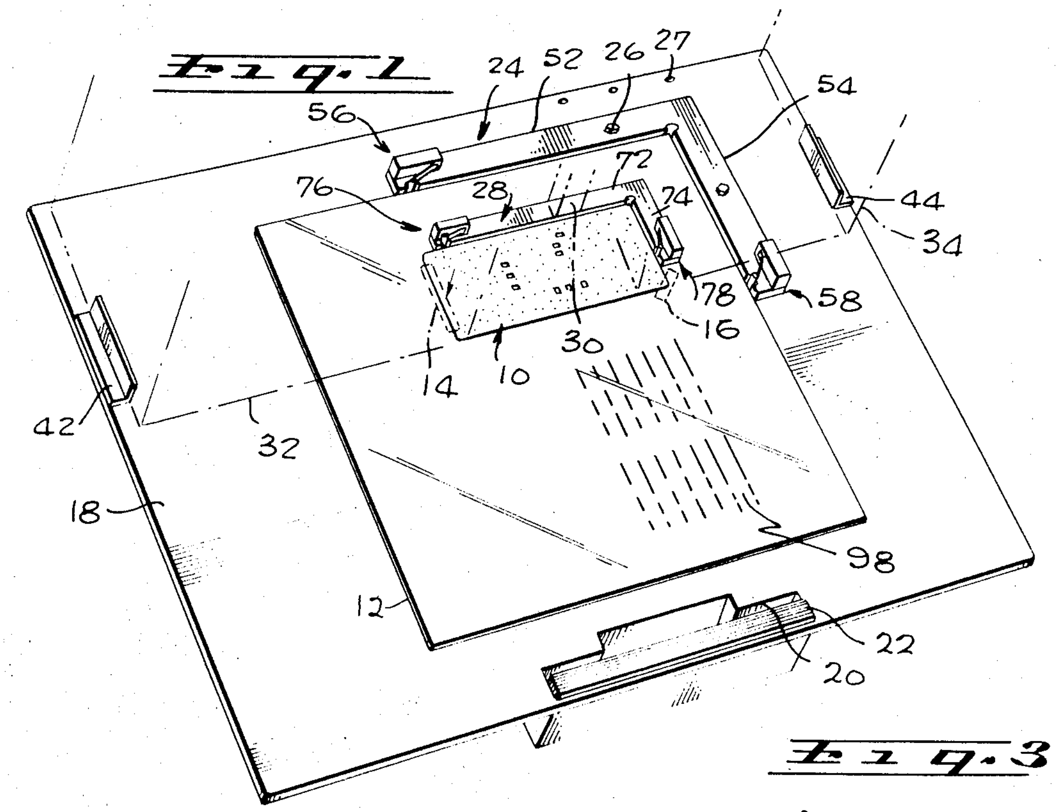
FIG. 1 is a perspective view of fastening apparatus constructed in accordance with the invention.

FIG. 1 illustrates apparatus for fastening an inventory control card 10 to the back of an album 12 by applying a pair of tape strips 14 and 16 to them. The apparatus comprises a platform 18 with a card-holding bin 20 at the front. A workman at the front of the platform takes a record album from a pile (not shown) and loads it on the platform in the position shown. He then removes a card from the stack 22 in the bin, and places it on the album at the position shown for the card 10. The apparatus automatically applies the tape strips at the proper positions when the album and card are in place. The workman removes the album with the card thereon and repeats the process with another album and card. The limited functions required of the workman allow him to perform the operation rapidly so that a high production rate is achieved. Yet, the equipment is simple and economical, and can be readily altered to apply a card at any position on an album.

Figure 2:
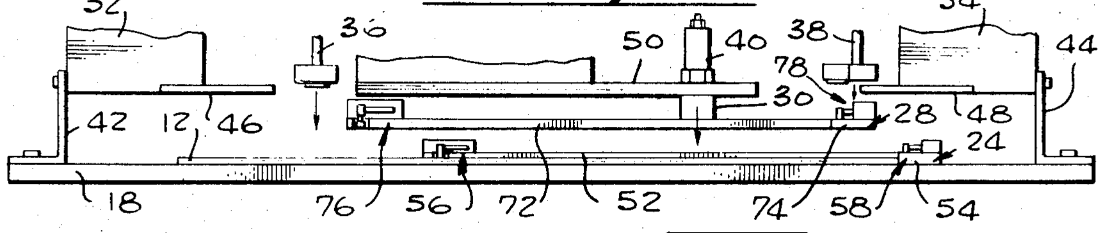
FIG. 2 is a front elevation view of the apparatus of FIG. 1.

The apparatus comprises an album nest 24 which receives a corner of the album 12 to fix its position on the platform 18. The album nest is fixed to the platform by a pair of bolts 26 that project through two of several holes 27 in the platform. A card nest 28 is held by a piston 30 which moves it up and down. The card nest is moved down only when an album is in place against the album nest. The card nest then moves down to clamp the album in place, and to provide a target for receiving the card 10. A pair of tape applying machines 32 and 34 each have tape plungers 36 and 38, shown in FIG. 2, that can move down to press a strip of tape on the album and card. The plungers move down only when a card is in place against the card nest 28. Immediately after the plungers move down to apply the tape strips, they and the card nest 28 move up to release the album. The album with the card thereon, can then be removed from the platform.

The tape applying machines 32 and 34 and the cylinder 40 which operates the card nest piston 30 are all held above the level of the platform 18 by a pair of brackets 42 and 44 that lie on either side of the platform. This provides a clear space immediately above the platform for receiving the album 12. The tape applying machines deliver labels from guide plates 46, 48 to the plungers 36, 38 after each plunger stroke. The tape applying machines are well known in the art and therefore have not been shown in detail. The cylinder 40 that moves the card nest up and down, is held by a plate 50 that is attached to the frames of the tape applying machines that are held by the brackets 42 and 44. The cylinder 40 is also well known in the art and therefore is not shown in detail.

The rapid fastening capability of the apparatus is achieved by reason of the automatic sensing of the album and card in the album and card nests. This results in operation of the card nest piston 40 and tape applying plungers without delay, and without intervention of the human operator.

Figure 3:
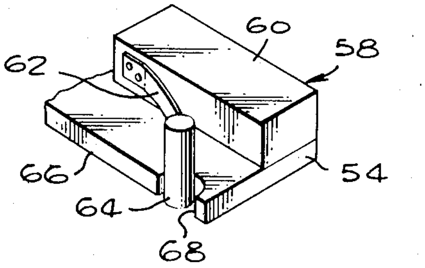
FIG. 3 is a partial perspective view of an album nest switch of the apparatus of FIG. 1.

The album nest 24 comprises a pair of arms 52 and 54 angled from each other, i.e., not aligned. Since the album is rectangular, the arms are joined at right angles at their inner ends. A pair of switches 56 and 58 are positioned at the outer ends of the arms, to sense the reception of the album against each nest arm. FIG. 3 illustrates the switch 58 of the album nest. The switch comprises a microswitch body 60 with an operating arm or leaf 62 that has a cylindrical end 64. The cylindrical end 64 is normally maintained outward from the edge 66 of the nest arm 54 which receives an edge of an album. However, when an album abuts the edge 66, the switch leaf end 64 is deflected back into a recess 68 in the arm. When such a deflection occurs, the microswitch is closed. The other switch 56 on the other nest arm 52 is constructed in a similar manner, with a cylindrical end that is deflected by the album to close the switch.

Figure 5:
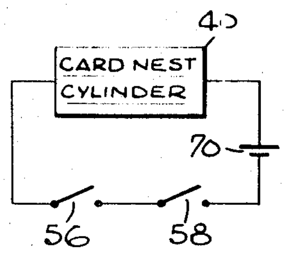
FIG. 5 is a simplified schematic diagram of a circuit for operating the card nest piston of the apparatus.

When both switches 56 and 58 are closed, this indicates that the album is properly placed on the platform. The album can then be clamped down by the card nest. FIG. 5 illustrates the manner by which the album nest switches 56 and 58 control the card nest piston 30. The switches 56 and 58 are connected in series. Only when both are closed can current flow from a power source 70 to the card nest cylinder 40. When such a current flow occurs, the card nest cylinder is opened to admit pressurized air, and the air moves down the card nest piston to clamp the album in place. The card nest is returned to its upward position only after both tape applying plungers have been operated.

Figure 4:
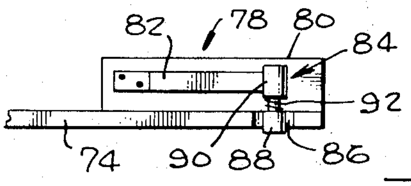
FIG. 4 is a partial elevation view of a card nest switch of the apparatus of FIG. 1.

The card nest 28 is similar to the album nest. It comprises a pair of card nest arms 72 and 74 joined at right angles at their inner ends, and supporting a pair of switches 76 and 78 at their outer ends. FIG. 4 illustrates one card nest switch 78, which is largely similar to the album nest switches. The switch 78 comprises a microswitch body 80 with an operating leaf or arm 82 that has an end 84. The end 84 is biased to a position forward of the card nest arm 74, but can be deflected into an arm recess 86 by a card. Unlike the album nest switch, however, the operating leaf end 84 of the card nest switch is not a simple cylinder, but includes a plunger 88.

The plunger 88 of the card nest switch is slideably mounted in a cylindrical guide 90 for up and down movement, and is biased downwardly by a spring 92. When the card nest moves down on a album, the bottom of the plunger is deflected up to the level of the album. It then rests on the album. This prevents the existance of a space under the plunger through which the card 10 can pass. The card is typically about 7 thousandths inch thick, so it could slip into any thin space under the plunger and thereby fail to operate the card nest switch 78. The bottom of the plunger must be flat or concave, but it should not be appreciably convexly rounded or else it could be deflected up by the card.

Figure 6:
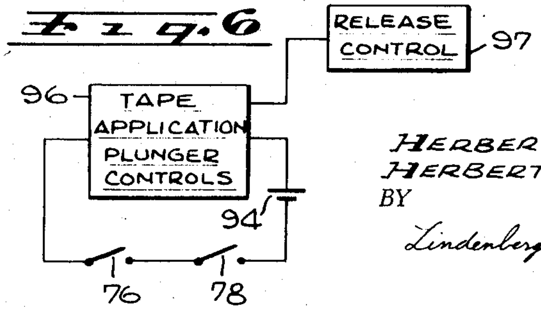
FIG. 6 is a simplified schematic diagram of a circuit for operating the tape applying pistons of the apparatus.

When both card nest switches 76 and 78 are closed, this indicates that the card is properly positioned on the album. The tape applying plungers can then be moved down to apply strips of tape to the card and album. FIG. 6 illustrates the manner by which the card nest switches control the tape applicator plungers 36 and 38, which is similar to the manner in which the album nest controls the card nest piston. Only when both card nest switches 76 and 78 are closed can currents flow from a source 94 through controls 96 that operate the tape plungers. A release control 97 senses the downward movement of the tape plungers, to return the card nest piston and tape plungers to their upward position as soon as the tape strips are applied.

The card nest piston 40 and tape plungers 36 and 38 are generally operated by pneumatic cylinders which move them down with a limited force such as 30 pounds. Thus, if an operator should place his hand under the card nest or tape plungers, no injury will result.

The fastening apparatus is designed to be used with a variety of album types. Generally, the album contains a list of songs on the enclosed record at an area 98 of the album rear face, and the card is placed beside this area so the area is not obscured. The position of this list-containing area 98 may vary for different albums. In order to change the position at which the card 10 is applied, only the album nest position need be changed. This is accomplished by removing the bolts 26 that hold the album nest to the platform, and screwing them in again after the album nest has been moved. Several sets of holes 27 are formed in the platform to facilitate repositioning of the album nest.

Although particular embodiments of the invention have been described and illustrated herein, it is recognized that modifications and variations may readily occur to those skilled in the art, and consequently, it is intended that the claims be interpreted to cover such modifications and equivalents.

What we claim is:

1. Apparatus for fastening first and second articles comprising:
first and second nest means for receiving said first and second articles, respectively;
first and second sensor means for detecting the reception of said first and second articles in said first and second nest means, respectively;
means responsive to said first sensor means detecting the reception of said first article in said first nest means, for moving said second nest means against an article received in said first nest means; and
means responsive to said second sensor means detecting the reception of said second article in said second nest means, for fastening said first and second articles together.

2. The apparatus described in claim 1 wherein:
one of said nest means comprises a pair of arms angled from each other; and
one of said sensor means comprises a pair of switches, one disposed on each of said arms, and means responsive to the operation of both of said switches for generating a signal indicating the reception of an article.

3. The apparatus described in claim 1 wherein:
said second nest means has an article receiving surface for abutting said second article; and
said second sensor means comprises a switch having an operating arm with an end biased forward of said article receiving surface to contact said second article, said end including a portion spring biased to a position closer to said first article than said second nest, whereby to prevent said second article from slipping between said first article and said switch end.

4. The apparatus described in claim 1 wherein:
said second nest means comprises an article receiving surface for abutting said second article; and
said second sensor means comprises a switch having an operating arm with a forward end biased forward of said article receiving surface, said forward end having a plunger biased toward a position below said second nest.

5. Apparatus for fastening a second article on a first article comprising:
a platform;
a first nest for receiving said first article;
means for mounting said first nest on said platform;
a second nest for receiving said second article;
piston means for moving said second nest toward and away from said platform to clamp in place and release a first article received in said first nest;
fastening means for fastening said first and second articles; and
means responsive to the reception of a second article in said second nest for operating said fastening means.

6. The apparatus described in claim 5 wherein:
said means for mounting comprises means for holding said first nest in any of a plurality of positions on said platform, whereby to change the position on said first article at which said second article is fastened.

7. The apparatus described in claim 5 wherein:
said first nest comprises a pair of arms positioned at substantially right angles, said arms having receiving surfaces for receiving said first article; and including;
a pair of switches, one mounted on each of said arms, said switches having operating means positioned forward of said receiving surfaces; and means responsive to the operation of both of said switches for operating said piston means.

8. Apparatus for fastening a card to an album comprising:
a platform for supporting said album;
a pair of album receiving arms mounted on said platform;
an album sensing switch mounted on each of said arms for sensing contact with the edges of an album;
a card nest positioned above said platform, said card nest having a pair of card receiving arms;
means responsive to both of said album sensing switches for moving said card nest toward and away from said platform;
a card sensing switch mounted on each of said card receiving arms;
means for fastening said card to said album; and
means responsive to both of said card sensing switches for operating said means for fastening.

References Cited

UNITED STATES PATENTS

| | | | |
|---|---|---|---|
| 2,969,587 | 1/1961 | Dixon | 29—407X |
| 3,465,411 | 9/1969 | Mahnken | 29—208X |
| 3,471,918 | 10/1969 | Vedvik et al. | 29—208 |

THOMAS H. EAGER, Primary Examiner

U.S. Cl. X.R.

29—407